May 26, 1959  R. P. LAWLER  2,888,655
HIGH SPEED RESISTANCE THERMOMETER
Filed Dec. 6, 1957  2 Sheets-Sheet 1
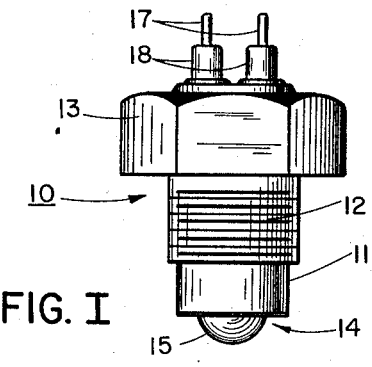
FIG. I
FIG. II
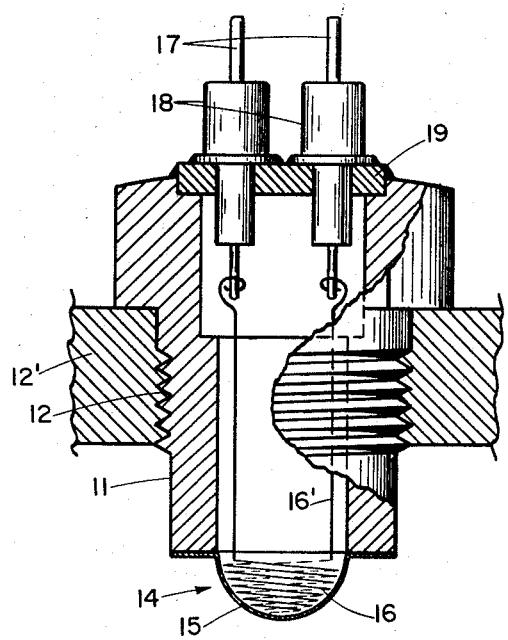
FIG. III
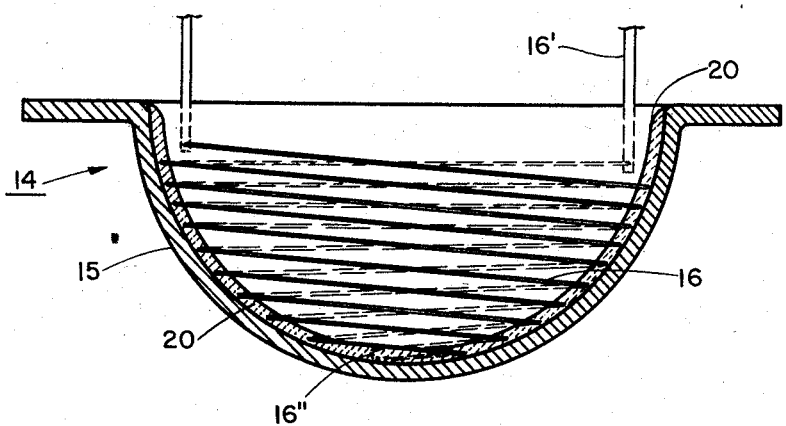
FIG. IV
INVENTOR
RICHARD P. LAWLER
BY
Lawrence H. Patton
AGENT May 26, 1959     R. P. LAWLER     2,888,655
HIGH SPEED RESISTANCE THERMOMETER
Filed Dec. 6, 1957     2 Sheets-Sheet 2
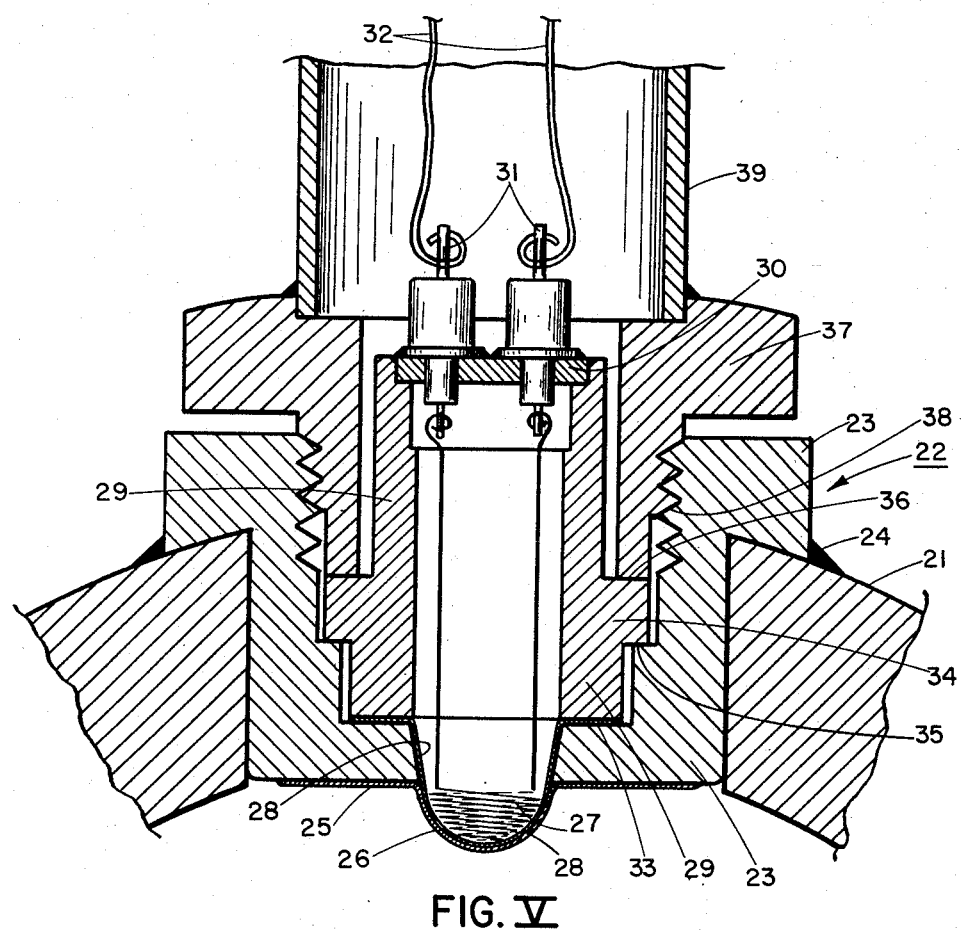
FIG. V
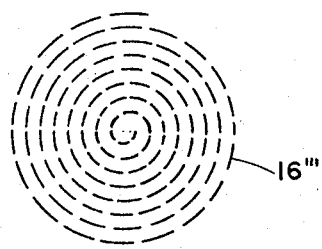
FIG. VI
INVENTOR
RICHARD P. LAWLER
BY
Lawrence H. Patton
AGENT

United States Patent Office 2,888,655
Patented May 26, 1959

2,888,655

HIGH SPEED RESISTANCE THERMOMETER

Richard P. Lawler, Foxboro, Mass., assignor to The Foxboro Company, Foxboro, Mass., a corporation of Massachusetts Application December 6, 1957, Serial No. 701,150

2 Claims. (Cl. 338—28)

This invention relates to temperature measuring devices and has particular reference to measuring devices incorporating temperature responsive electrical resistance elements, commonly called resistance bulbs.

Such resistance bulbs are widely used in industrial instrumentation. They comprise an electrical resistance element which is subjected to the temperature change which is being measured. This temperature change causes a resistance change in the element, and this resistance change, in turn, is used to affect an electrical circuit in a representation of the temperature change. The resistance element is usually mounted in a separate housing, and used as one arm of an electrical Wheatstone bridge which is usually located in an adjacent mounting head, or in apparatus associated therewith. In many instances such resistance bulbs are located in tanks or pipes which contain or carry fluids which may be under substantial pressures as well as being subject to temperature variation. Resistance bulbs for such applications must, therefore, be capable of withstanding substantial pressures, while at the same time providing a suitable response to temperature changes. Accordingly, the structure of resistance bulbs for such applications is provided as a compromise between the need for structural strength and the need for speed and accuracy of response to temperature change, so that the pressures involved cannot so deform the bulb as to bend or stretch the resistance element and produce an error in the form of an appreciable "strain gauge" effect.

In the past, such errors have been avoided by incorporating substantial protective structure in the resistance bulbs. Thus, bulb deformation due to pressure, and bulb dimension change due to temperature change, were not allowed to be factors which could produce any substantial "strain gauge" effects on the resistance element. However, such arrangements, while protecting the resistance element, necessarily resulted in relatively slow response to temperature change because the heat, in order to be felt at the resistance element, not only had to traverse the surface resistance of the bulb, but also had to traverse the thickness of the wall of the bulb and whatever arrangements of material or spacing were used to protect the resistance element.

If even small amounts of such deformation or bulb dimension change are transferred to the resistance element, strain gauge effects, i.e. resistance changes, are produced, causing temperature measurement errors which are substantial in present day practices.

To overcome prior art difficulties such as set forth above, this invention provides an electrical resistance element winding on the inner, concave surface of a thin, dome-like member, with the outer surface thereof intended for direct contact with the liquid, gas, or other material whose temperature is to be measured, and with the resistance element wound in a spiral and effectively in direct contact with the inner surface of this dome throughout the spiral.

This invention thus provides a mounting for the resistance element which is thin, with high thermal conductivity, but strong and stiff, and in a dome-like form designed to resist deformation in itself as from external pressure, and to minimize deformation of the resistance element due to dimension change in the mounting, caused by temperature change.

The dome-like structure of this invention has the advantage that external pressures are applied as compression, and this structure, particularly with a material such as stainless steel, strongly resists compression.

Thus, the device for this invention provides high speed, minimum error transfer of temperature change to the electrical resistance element.

It is, therefore, an object of this invention to provide a new and improved electrical resistance temperature measuring device.

Other objects and advantages of this invention will be in part apparent and in part pointed out hereinafter, and in the accompanying drawings, wherein:

Figure I is an elevation of an electrical resistance temperature measuring device according to this invention;

Figure II is a bottom view of the structure of Figure I;

Figure III is a further illustration of the device of Figure I, in partial, vertical, and central section, with the resistance element shown schematically and without binding cement;

Figure IV is an enlarged, full detail showing of the resistance element portion of Figure II;

Figure V is an illustration of a partciular application of the resistance thermometer bulb of this invention, showing a "well" construction;

Figure VI is a fanciful, dotted line spiral to indicate that the resistance elements, which are shown in Figures III, IV, and V, as bare wire, bifilar, spaced turn, overall dome-shape windings, are wound spirally.

The external formation of a high speed resistance thermometer bulb according to this invention is illustrated in Figures I and II. The bulb is indicated generally as at 10 and, as seen in Figure I, comprises a housing 11 which is generally cylindrical with an external, lengthwise central threaded portion 12 for mounting the bulb in process pipes or tanks or the like, and a head portion 13 formed as a nut which is usable both as a mounting and dismounting device and as a shoulder over-lying portion to aid in securing and sealing the bulb to such a process pipe or tank.

The bulb 10 also consists of an end cap 14 having a central dome-like formation 15 within which (Figure III) the actual resistance winding 16 of the thermometer bulb is located. The winding 16 is a bare wire, spaced turn, bifilar winding, spiraled as indicated at 16''', Figure VI. The bulb 10 of Figure I is provided at its top with a pair of electrical output connections 17. These represent electrical connections from the two ends of the single resistance wire which comprises the resistance winding 16 in the dome-like formation 15 of the bulb cap 14.

The body 11 of the bulb 10 may be formed of any suitably strong and stiff material and the end cap 14, with its dome 15, may be formed of any material which is highly thermally conductive as well as suitably strong and stiff with respect to the expected pressures which are likely to be met under the process conditions of a particular application. As one example, both the body 11 and the cap and dome 14 and 15 of the thermometer bulb may be of highly thermally conductive stainless steel. Stainless steel is additionally useful as bulb material in applications where there is a possibility of rusting, corroson or other deterioration from the association of the process material with the thermometer bulb.

The resistance winding 16 in the dome 15 is connected to the electrical connectors 17 by means of flat strip intermediate wires 16' which have low resistance change with temperature change and which have air space thermal insulation from the bulb body 11, and the connectors 17 are thermally insulated by ceramic sleeves 18.

The stainless steel bulb cap dome 15 is preferably formed by drawing, in order to achieve the condition of the greatest possible strength of the stainless steel with a very thin body. That is, the dome 15 is formed for high thermal conductivity, stiffness and strength, by selection of material and by forming the material to a substantial thinness, for example, 15 mils, and by forming the dome in its illustrated shape, that is, in the order of a hemisphere or a portion thereof. Thus, any pressures applied to the outside of this dome 15 tend to compress the dome since it is convex with respect to the process.

Stainless steel, as an example, resists compression substantially better than it resists tension; therefore, this externally convex dome of thin stainless steel is strongly resistant to process pressures which might tend to produce strain gauge effects in the resistance wire 16 within the dome 15.

As illustrated in Figure III, the bulb 10 is mounted through a pipe or tank wall 12' by means of the bulb body thread 12. The body 11 of this thermometer bulb is generally in the form of a cylindrical sleeve wherein the resistance wire cap 14 covers and seals off one end of the tube and a fail-safe protective closure 19 securely closes off the other end of the housing 11. This arrangement is a safety factor in the event of rupture of the resistance element dome 15.

The process fluids and pressures are accordingly prevented from escaping from the process pipe or tank. For this purpose, the closure member 19 may be made suitable to withstand pressures far above that expected in the process and may also be made of material which resists corrosion and other deterioration from the process material in the event of rupture of the resistance element dome 15 from any cause. The pair of the electrical conductors 17 are mounted to extend through the fail-safe closure 19 and are enclosed, in their passage through the closure 19, in the thermal and electrical insulating ceramic sleeves 18. These connections 17 and sleeves 18 are securely mounted in the closure 19 to match the fail-safe properties of the closure member 19 and they form leads by means of which the resistance coil 16 may be electrically connected to an operating circuit outside of the resistance bulb.

Figure VI illustrates that the resistance wire is wound in spiral formation and Figure IV illustrates this spiral formation as a single, bare wire in a spaced turn, bifilar winding within the stainless steel dome 15 of the resistance bulb 10.

As in Figure IV, it may be seen that the resistance wire coil 16 is held in close association with the inner concave surface of the dome 15 by means of a body of cement 20. This may be, for example, an aluminum oxide base ceramic cement which is a stable inorganic compound which has high thermal conductivity and is a good electrical insulator. The resistance wire 16 is, for example, bare platinum wound in spaced turns so as not to contact itself and separated from the inner concave surface of the dome 15 by a thin layer of the cement 20, this cement layer being, for example, of the order of 1 mil thick. The wire itself may be of the order of 1 mil or less in diameter and the stainless steel dome 15 may be of the order of thickness of 15 mils.

The cement 20 is preferably of a thickness just about suitable to hold the wire coil 16 securely against the inner concave surface of the dome 15. The cement, therefore, may have a total thickness of the order of 10 to 15 mils. The return bend 16" of the single wire bifilar spiral winding 16 is essentially at the deepest point in the concave surface of the dome 15, that is, at the center portion thereof. The intermediate connector flat strip wires 16' are anchored in the cement 20, and the connections between the ends of the wire 16 and the intermediate wires 16' are also embedded in the cement 20. Thus, the resistance wire 16 is entirely embedded in the cement 20.

Speed of response in thermometer bulbs of this nature is a matter of a thermal resistance, thermal capacity, time constant combination. In this instance, the thermal resistance comprises first, the surface thermal resistance on the outer face of the dome 15, then the resistance due to the material of the dome and the thickness of the dome, and lastly to the thickness of the cement 20 lying between the dome and the resistance wire 16 as well as the thermal conductivity factor of this cement. The thermal capacity factor is the mass of the cement which surrounds the resistance wire 16. This body of cement must be wholly brought to the desired temperature before the full impact of this temperature is registered in the resistance wire itself. Thus, in order to get a high speed resistance thermometer, it is necessary to get a low resistance-capacity (R-C) time constant. Accordingly, even with highly thermally conductive material such as the stainless steel used in the dome 15, it is important to get this dome as thin as possible without sacrificing strength or stiffness, and it is important to put in as little as possible of the cement 20 in order to reduce the capacity factor in the R-C combination.

This invention provides a high speed resistance thermometer which is capable of withstanding very substantial pressures. As an example, with a stainless steel dome of the thickness order of 15 mils and with an essentially spherical shape, this resistance bulb may suitably be operated at 2500 p.s.i. and at 700° F. A substantial variation of such pressure and temperature factors may, of course, be handled providing suitable materials and dimensions are utilized in the resistance bulb on the basis of providing a comparably low R-C time constant combination.

This invention, therefore, provides a high speed resistance thermometer bulb by placing a bare resistance wire in close, but not contacting, highly thermally conductive association with a thin wall, highly thermally conductive dome shaped member which by its material and formation combines strength and stiffness to minimize strain gauge effect errors in the resistance wire.

With reference to Figure V, in some instances of thermometer bulb use, it is desirable to use a "well" construction. This arrangement comprises a fixed, essentially permanent well arrangement mounted in a process pipe or tank and a removable thermometer bulb assembly which may readily be mounted in or dismounted from the well. Such a structure, utilizing the thermometer bulb of the present invention, is illustrated in Figure V.

In Figure V, a process pipe 21 is shown, with a well assembly 22 mounted therein. The well assembly 22 comprises a sleeve member 23 extending through an opening in the process pipe 21 and securely welded thereto as at 24. The well assembly 22 further comprises an end cap 25 having a dome 26 therein which is externally convex with respect to the process, that is the interior of the process pipe 21. The dome 26 is comparable in all respects to the resistance wire dome of Figures I–IV except that the resistance wire is not wound against the inner concave surface of the well dome 26. The resistance wire coil in Figure V, indicated at 27, is instead wound inside of, and in close association with, the internal concave surface of a second dome member 28, which is removably nested in the dome 26, in close fitting relation therewith.

This second dome 28 is preferably of highly thermally conductive material with sufficient strength and stiffness to support the resistance wire and cement in the fashion indicated in Figure IV, but the thickness of the second dome 28 of Figure V is much less than that of the Figure V dome 26 or the dome 15 of Figures I–IV. With this arrangement, a suitable well structure is made possible with all of the deformation protection of the bulb of Figures I–IV, and, since the second inner dome 28 need not bear the brunt of such forces, it is made sufficiently thin so that its contribution to the thermal resistance of the double bulb is negligible. In this manner, a high speed resistance bulb is provided in a well application.

The second dome 28 in Figure V is an end closure for a thermometer bulb sleeve 29 which is comparable to the body 11 of the thermometer bulb 10 of Figures I and II. In like manner with the structure illustrated in Figure II, the sleeve 29 of Figure V is provided with an inner end closure 30 which has strength and rigidity and resistance to corrosion, etc. in the same manner of being a fail-safe device as has been indicated for the closure member 18 of Figure II. A pair of electrical conductors 31 extend through the closure member 30 with suitable electrical and thermal insulation therefrom and mounted for strong resistance to pressure and corrosion and the like, in continuance of the fail-safe action of the closure 30. The end connections of the resistance winding 27 are connected by the usual flat strip wires to the electrical connectors 31 and electrical connections 32 therefrom on the outside of the closure 30 are provided for connecting the resistance coil 27 to suitable electrical circuitry (not shown).

The Figure V thermometer bulb sleeve 29 has its annular outer end, to which the dome member 28 is attached, resting on a shoulder 33 of the well application adapter plug 23. The thermometer bulb sleeve 29 is also provided with an annular shoulder 34 whose lower surface rests on a shoulder 35 of the well adapter plug 23, and whose upper surface 36 receives the lower annular end of a sleeve nut 37 which is used to assemble the bulb sleeve 29 to the well adapter plug 23 by means of a mutual thread arrangement 38 between the well adapter plug 23 and the sleeve nut 37.

Above the sleeve nut 37 and securely attached thereto, is a ceramic thermal insulator sleeve 39 which encloses the lead wires 32 from the electrical connectors 31 and forms a heat insulated chamber to prevent the process heat from reaching to the lead wires 32 or to associated instrumentation (not shown).

The resistance dome of this invention for best results should approximate a hemisphere or a section thereof; and with the material used provided in its best state of compromise between strength, stiffness, and thinness. For example, stainless steel formed and stretched will achieve varying hardness. Thus, the material for the dome according to this invention may be stainless steel formed and stretched to a calculated degree. For high pressures, five to ten per cent more or less from true hemispherical form may be used, but for lesser pressures, different curves may be used as long as the curved, general dome shape is maintained.

An example of a resistance wire which is suitable as the temperature sensitive resistance element 16 or 27 is iron-nickel alloy wire, .8 mils–1 mil in diameter, with a high Curie point. The use of a low carbon stainless steel in the bulb itself avoids corrosion at weld points. With this arrangement, the response time of this resistance thermometer is less than one second, and the construction shown provides for a minimum of stem conduction. It should be noted that the spherical shape of the resistance wire domes used in this device makes possible the cutting down of wall thickness as compared to a flat element and, therefore, increases the speed of heat transfer. Such dome shape has a pressure advantage over a flat disc of the order of 30 to 1.

This invention, therefore, provides a new and improved resistance bulb thermometer device which has a dome shaped resistance winding support in combination with an inner spiral winding. This arrangement minimizes the time constant of a resistance thermometer with strain free construction for high pressure service.

As many embodiments may be made of the above invention, and as changes may be made in the embodiments set forth above without departing from the scope of the invention, it is to be understood that all matter hereinbefore set forth and shown in the accompanying drawings is to be interpreted as illustrative only and not in a limiting sense.

I claim:

1. An electrical resistance thermometer bulb assembly comprising a sleeve of low thermal conductivity material with high mechanical strength, a cup-like member closing off one end of said sleeve and provided as an essentially hemispherical dome of high mechanical strength and stiffness which is externally convex and formed of thin, high thermal conductivity material, an electrical resistance bare wire element located inside the concavity of said dome in single wire bifilar spaced turn spiral winding arrangement, with the return bend in said wire located essentially at the deepest point of said concavity and with said wire in close operative association with the inner, concave wall of said dome throughout its extent within said dome, a body of high thermal conductivity and electrically insulating cement covering said wire and lying as a thin wall between said wire and said inner wall of said dome, said wire and said cement occupying a small portion only of the volume inside said dome, said thin wall and said cement together providing a low time constant combination of thermal resistance and thermal capacity, a high pressure closure at the other end of said sleeve as a fail-safe device in the event of rupture of said dome, and electrical connection means extending from said coil to and through said rigid closure in high pressures sealed and electrically insulated relation therewith.

2. An electrical resistance thermometer bulb assembly comprising a sleeve of high mechanical strength, a cup-like member closing off one end of said sleeve and provided as an essentially hemispherical dome of high mechanical strength and stiffness which is externally convex and formed of thin, high thermal conductivity material with said strength and stiffness derived in substantial measure from the shape of said dome, an electrical resistance bare wire element located inside the concavity of said dome and itself essentially defining a hemispherical dome form fitting within said dome, said element being a single wire bifilar spaced turn spiral winding arrangement, with the return bend in said wire located essentially at the deepest point of said concavity and with said wire in close operative association with the inner, concave wall of said dome throughout its extent within said dome, a body of high thermal conductivity and electrically insulating cement covering said wire and lying as a thin wall between said wire and said inner wall of said dome, said wire and said cement occupying a small portion only of the volume inside said dome, said thin wall and said cement together providing a low time constant combination of thermal resistance and thermal capacity, a high pressure closure at the other end of said sleeve as a fail-safe device in the event of rupture of said dome, and electrical connection means extending from said coil to and through said rigid closure in high pressure sealed and electrically insulated relation therewith.

References Cited in the file of this patent

UNITED STATES PATENTS

| | | |
|---|---|---|
| 2,465,981 | Robertson | Mar. 29, 1949 |
| 2,470,653 | Schulman et al. | May 17, 1949 |

FOREIGN PATENTS

| | | |
|---|---|---|
| 230,734 | Switzerland | Aug. 6, 1941 |
| 468,018 | Italy | Dec. 29, 1951 |